Figure 1:
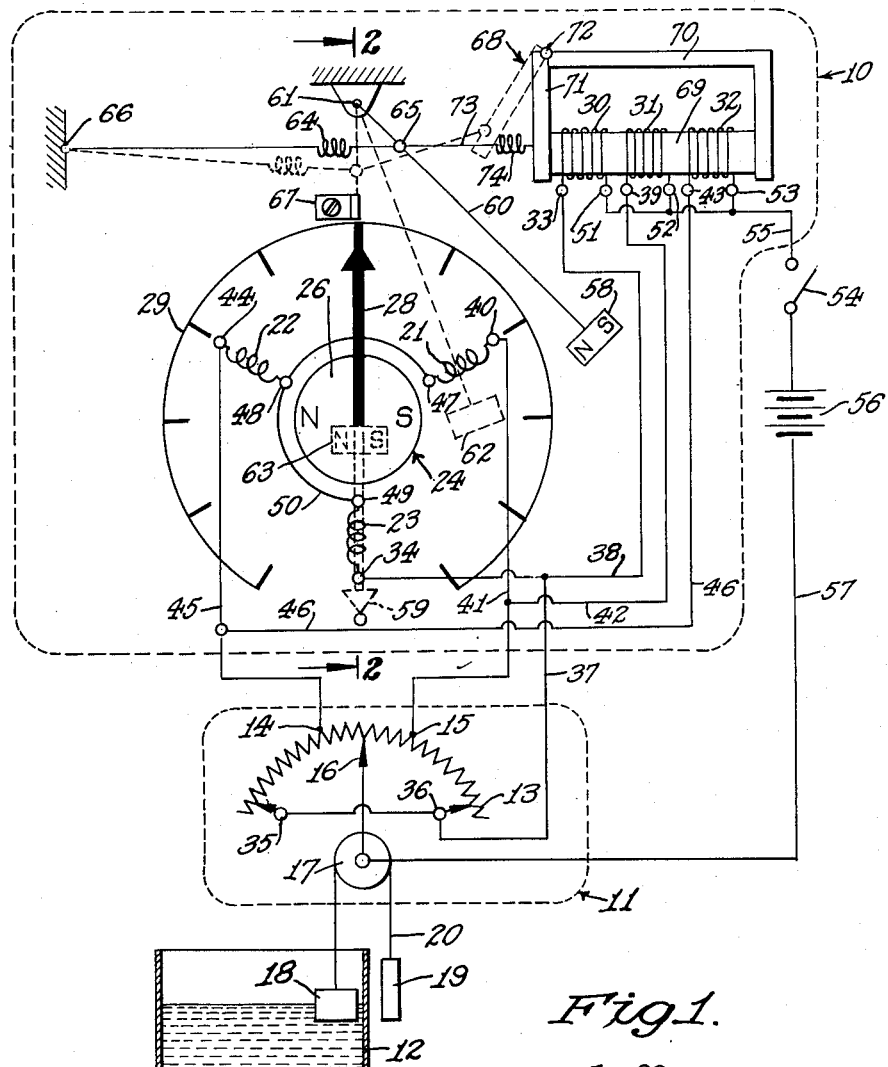

June 13, 1950     C. A. DE GIERS     2,511,399
INDICATING INSTRUMENT DEACTIVATION
INDICATION APPARATUS
Filed June 28, 1946

INVENTOR.
CLARENCE A. DE GIERS
BY Ernest D. Given
ATTORNEY

Patented June 13, 1950

2,511,399

UNITED STATES PATENT OFFICE 2,511,399

INDICATING INSTRUMENT DEACTIVATION INDICATION APPARATUS

Clarence A. de Giers, Forest Hills, N. Y., assignor to The Liquidometer Corporation, Long Island City, N. Y., a corporation of Delaware Application June 28, 1946, Serial No. 679,921

8 Claims. (Cl. 171—95)

This invention relates to an indicating instrument and particularly to apparatus for indicating the deactivation thereof, for example by moving a pointer or other movable indicating element of the instrument to some predetermined position, such as an off-scale position, to show that the instrument as a whole is deactivated in some way or for some reason. More particularly, the invention relates to electrical instruments, which are activated by the flow of electric current therethrough, and wherein it is desired to indicate to an observer that for some reason the flow of current has ceased, so that the instrument does not record or indicate the true magnitude of a condition, which it is designed to indicate when activated in the usual way. The invention is not, however, specifically limited to electrical instruments, nor to instruments for indicating any particular condition, and is applicable to instruments which may indicate the magnitude of any condition, positive or negative, and chemical, physical or electrical in character.

Electrical instruments often have embodied in their construction provision for returning the pointers to some "off" position when the instrument is not in use. Such provisions are important in practice, since in the event of power failure, they will cause the pointer to swing to some predetermined point, as off-scale, thereby warning the operator that the system has been shut down deliberately or has failed inadvertently, and thus preventing him from obtaining erroneous readings. In some instruments, such as ratiometers, these provisions have included the introduction either of hair springs or of stationarily mounted, permanent auxiliary magnets. Such devices, however, have the disadvantage that they introduce a constant force effective upon the motion and hence the position of the pointer or movable indicating element throughout the use of the instrument. While such errors may sometimes be calibrated out of the instrument by adjustment thereof or by suitable permanent variations in the scale graduations, they nevertheless cause scale distortion, which results in some non-linearity in respect to a normal scale. Furthermore, when considering the effect of voltage fluctuations on an indicator such as a ratiometer, it has been found that the increase or decrease in voltage will normally affect all coils of a multi-coil instrument in the same proportions. This in itself will thus not cause an error in indication, but since the effect of the pointer returning means remains substantially constant throughout the entire range of voltage fluctuations, this latter force, being no longer proportional or determinable in respect to the force effective to position the movable element of the indicator, introduces an error into the indication.

Other methods of indicating power failure have been the employment of one or more pilot lamps. This method has been found not completely reliable, since it is possible for the lamp itself to fail, thus limiting its utility.

Another limitation in the use of stationarily mounted, auxiliary permanent magnets is that in long scale indicators, such as those having approximately 360° scales, there is usually a dead spot at which the effect of the auxiliary permanent magnet is neutralized. In such a construction, if the power is turned off or fails when the pointer or movable indicating element is approximately directly opposite the "power off" position, it will fail to return to such position due to the forces tending to move it in opposite directions being equal. As a result, if the movable indicating element happens to be in the dead zone at the time of power cut-off or failure, it may remain in that position, giving an erroneous indication.

Among the objects of the present invention is to provide a means which will be mechanically and electrically independent of the ordinary actuating means for the movable indicating element and will have no effect upon the position of that element during the normal actuation of the instrument and yet will be effective upon the deactivation of the instrument, for example by power cut-off or failure, to move the movable indicating element thereof to a predetermined, and usually off-scale, position.

A further and more specific object of the present invention is to provide, in an electrical instrument having a permanent magnet movable with the movable indicating element, an auxiliary magnet mounted for movement into and out of the field of the first named permanent magnet, so that when the power is "on" to the instrument, the auxiliary magnet is maintained wholly outside the field of the first named permanent magnet and does not affect the position of the pointer or other movable indicating element. In this way the auxiliary magnet will not introduce errors into the indication provided by the instrument in the event of voltage fluctuations and at the same time will not affect or require a change in the normal scale calibration of the instrument.

A further object of the invention is to provide a path of movement for the auxiliary magnet between its inoperative position and its operative position, such that, in the event that the power is cut off or fails at a time when the movable indicating element is in the dead zone, as above set forth, a force will be brought into effect during the movement of the auxiliary magnet to its operative position, to move the movable indicating element out of the dead zone position so that this element will be insured of movement to the predetermined off-scale position indicating that the instrument is deactivated.

A further object of the invention is to provide a means for moving a pointer or other movable indicating element of an instrument as aforesaid to a predetermined position indicating deactivation of the instrument without employing an additional power source other than that required for the normal operation of the instrument.

Figure 2:
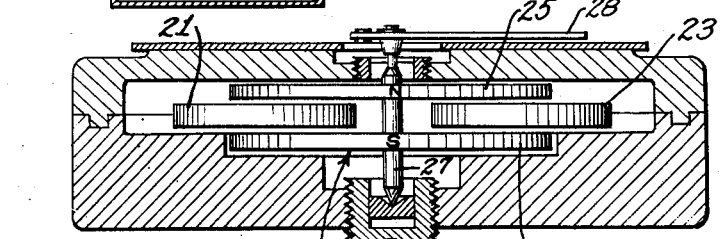

Other and more specific objects of the present invention will become apparent from the following specification and appended claims, when considered in connection with the accompanying drawings in which:

Figure 1 is a diagrammatic illustration showing an electrical instrument having means for indicating deactivation of the instrument in accordance with the present invention; and Fig. 2 is a fragmentary view of an instrument embodying the present invention taken substantially on the line 2—2 of Fig. 1, but showing the pointer at the predetermined off-scale position corresponding to that shown in dotted lines in Fig. 1.

The essential features of the present invention are, first, as to the type of instrument to which it is applicable. In this respect, it will be understood that the invention is neither applicable nor necessary to an instrument wherein the movable indicating element is always connected to the actuating means, which in turn is responsive to the magnitude of the condition to be indicated. For example, in a conventional aneroid barometer, the barometric capsule, which is responsive to the surrounding barometric pressure, is usually constantly mechanically connected to the pointer of the instrument. In such a case, there is no call for an apparatus by which to indicate when the instrument is out of operation, for, due to the continuously operating mechanical connection between the actuating means and the indicator, the instrument is always actuated or energized.

On the other hand, the invention is applicable to any type of indicating instrument, which may be activated or de-activated either manually and deliberately, or, for example, by the failure of some part or the opening of an electrical circuit and inadvertently. Under such circumstances it is important to know that the instrument is out of operation, the indication of which condition is a major purpose of the present invention.

The invention is applicable to instruments whether mechanically or electrically operated or operated by some combination of both mechanical and electrical means. The actuation of the movable indicating element in accordance with the present invention may be effected mechanically or by some mechanical and/or electrical interconnection, and means (mechanical or electrical in character, or both) may be provided according to the present teaching to set the movable indicating element to a position indicating that the instrument is out of operation or deactivated. As such, the reset means, which particularly forms the subject matter of the present invention, may be mechanical or electrical, or as hereinafter specifically disclosed, a combination of both. It may also be applicable to instruments wherein the indication is effected by the relative movement of any two parts. For example, in the instrument particularly hereinafter described, a pointer is made rotatable with respect to a fixed scale. Thus the pointer is the movable indicating element and the scale, the fixed indicating element. Such elements could be in effect interchanged, for example as a compass card, to put the scale on the movable element and to use a single, fixed index cooperating therewith. Again, while the relative motion in the present case as particularly hereinafter described is circular, i. e., about a single axis of rotation, it is contemplated that the invention could advantageously be applied to instruments wherein the movable element operates in a straight or otherwise shaped path.

Considering now the application of the invention to an electrical instrument, and wherein the instrument itself, such as the ratiometer hereinafter particularly described, employs permanently magnetized armature or rotor parts as a part of the instrument per se, the reset arrangement may be effected by the introduction into a magnetic field of a permanent magnet of the rotor of a directional magnetic force which will react with the field of this permanent magnet of the instrument to cause a movement of the indicating element thereof to a predetermined off-scale position. This may be effected as particularly hereinafter described by moving a magnet between an operative position in the field of this instrument magnet and an inoperative position out of this field or by providing an electromagnet stationarily located in this field and energized only when it is desired to move the instrument to its off-scale position, i. e., when the instrument as a whole is deactivated. On the other hand, in the event that a movable, auxiliary, or reset magnet is used, it may be either a permanent magnet or an electromagnet, energized at least at the proper times, if not continuously. The following description and appended claims are to be understood with these principles and requirements in mind.

Referring now to the accompanying drawings and particularly to Fig. 1, there is shown at 10, an indicator or indicating instrument of the ratiometer type, which is shown cooperating with a telemetering type transmitter 11, these instruments being indicated as entities by the dotted outlines shown on the drawing, Fig. 1. Also, for purposes of illustration, the transmitter 11 is shown applied to the measurement of the liquid level in a tank 12, which may, for example, be the fuel tank of a motor vehicle or an airplane. The transmitter 11 may comprise an electrical resistance element 13, which may be divided into three sections by taps 14 and 15. A wiper 16 is arranged to move over the resistance element 13 in any suitable way as by the action of a pulley 17, a float 18 in the liquid in the tank 12 and a counterweight 19. As shown, a suitable flexible element such as a rope, cord or chain 20 is trained around the pulley 17 and connects the float 18 and the counterweight 19. Thus, when the float 18 is at the bottom of the tank, the wiper 16 will be at the left hand end (as shown, Fig. 1) of its movement in respect to the resistance element 13. When liquid is filled into the tank 12, so that the level gradually rises, the wiper 16 will move correspondingly toward the right hand end (as shown) of its movement in respect to the resistance element 13.

The indicating instrument 10 shown on the accompanying drawings may be of the ratiometer type such, for example, as is more particularly disclosed in the copending joint application of the present applicant and Osterlund, Ser. No. 633,800, filed December 8, 1945, now Patent No. 2,450,331, granted September 28, 1948, this type instrument being illustrated and in part described for purposes of example only and not being intended as limiting the present invention. The instrument comprises three permanently fixed coils 21, 22, 23, which are spaced about a permanent magnet rotor, generally indicated at 24. As shown in Fig. 2 of the drawings, the permanent magnet rotor may include two similar permanent magnets 25 and 26, spaced apart on a common rotor shaft 27, which is suitably journaled in appropriate type bearings in the instrument, the magnets 25 and 26 being adapted to be spaced from but to overlie and underlie, respectively, the disc like coils 21, 22 and 23, two of which are shown in Fig. 2. The permanent magnets 25 and 26 are preferably of some material of high retentivity, such as Alnico, and are preferably mounted coaxially with the shaft 27 of the rotor. Also secured to the shaft 27 is a pointer 28, which is the movable indicating element of the instrument shown, this element cooperating with a stationary scale or fixed indicating element here shown diagrammatically in Fig. 1 at 29. The indicator also has associated therewith three resistors or magnet coils 30, 31 and 32, which will be described hereinafter in further detail. The lower magnet 26 only is shown in Fig. 1 as it is the field of this magnet which is employed in effecting reset of the pointer as hereinafter set forth.

The aforesaid parts are electrically connected by suitable conductors as follows. One end 33 of the resistor 30 is connected to an end 34 of the coil 23 and also to the ends 35 and 36 of the transmitter resistor 13 by line wires 37 and 38. One end 39 of the resistor 31 is connected to one end 40 of the coil 21 and also to the tap 15 of the transmitter resistance element 13 by line wires 41 and 42. Similarly one end 43 of the resistor 32 is connected to one end 44 of the coil 22 and also to the tap 14 of the transmitter element 13 by line wires 45 and 46. The three inner ends 47, 48 and 49 of the coils 21, 22 and 23, respectively, are connected together by a common wire 50. Similarly, the three remaining ends 51, 52 and 53 of the resistors 30, 31 and 32 are made common, and connected to one terminal of a switch 54 by a line wire 55. The other terminal of the switch 54 is connected to one (the positive) terminal of a battery 56, or other source of direct current E. M. F., the other (negative) terminal of which is connected through a line wire 57 to the wiper 16. The construction of the instrument-system as thus far described in respect to Figs. 1 and 2 may be considered substantially the same as that of application Ser. No. 633,800 above referred to, the operation of which will be obvious to those skilled in the art.

In accordance with the present invention, an auxiliary permanent magnet 58 is provided to bring the pointer 28 to an off-scale position, such as that shown in dotted lines at 59 (Fig. 1) when the power to the coils 21, 22 and 23 is off, for example by the opening of the switch 54. The auxiliary magnet is mounted rigidly on an arm 60, which is suitably pivoted as diagrammatically illustrated in Fig. 1, for movement about a fixed point 61, so that it may move between an inoperative position shown in full lines at the right in Fig. 1, through an intermediate position indicated by the reference number 62 in that figure wherein the parts are shown in broken lines, to an operative position substantially centrally of the instrument 10, as illustrated in broken lines at 63 and also shown in full lines in Fig. 2. At the operative position, the magnet 58 will be in the field of at least one of the permanent magnets carried by the rotor 24 as shown, i. e., within the field of the magnet shown particularly in Fig. 2 at 26.

When the indicating instrument is de-energized as by cessation of electric current flow through the coils 21, 22 and 23, the permanent magnet 58 is swung to the position 63 (Fig. 1) by a spring 64 which is connected to extend between a point on the arm 60, shown at 65, and a fixed anchorage 66. A suitable stop 67 is provided to limit the movement of the arm 60 in a clockwise direction from the full line (inoperative) position shown toward its operative position shown at 63, Fig. 1. At the position 63, the permanent magnet 58 is in the field of the magnet 26 thereof and will affect its position and hence that of the movable indicating element 28. The auxiliary magnet 58 is preferably arranged to move below the rotor 24 as best shown in Fig. 2.

Also cooperating with the auxiliary magnet 58 and the arm 60 by which it is carried and for the purpose of moving this arm and magnet to their inoperative position is a solenoid or electromagnetic holding means generally indicated at 68, which may be of any suitable type, but is shown as being made up with a cast iron core 69 on which are wound the resistors 30, 31 and 32. The magnetic circuit is then completed through a heel-piece 70 and a clapper or armature 71, which is hinged to the heel piece 70 at a point 72. When the solenoid is energized, the clapper or armature 71 is pulled against the core 69 as shown in full lines in Fig. 1 and in so doing acts through a connection 73 to overcome the tension of the spring 64, thereby swinging the armature 60 in a counterclockwise direction, as shown in Fig. 1, to the full line position thereof as shown in that figure at which the magnet 58 is laterally out of the field of the rotor magnet 26. If desired, means (not shown) may be provided for shielding the permanent magnet 59 at its inoperative position. Such an arrangement may be of importance where space limitations are critical. Further, if desired, the connection between the clapper 71 and the point 65 as shown may be either a resilient connection including a spring 74 or may be a non-resilient and/or an inflexible link-type connection.

While the resistors 30, 31 and 32 may be a part of the indicator circuit as shown, it is preferred to use the power consumed by these resistors to effect the movement of the arm 60 and the auxiliary permanent magnet 58 to their inoperative position by energizing the solenoid 68. For this purpose, these resistors are wound as coils about the core 69 so that all of them, when energized, tend to draw the armature or clapper 71 toward the core 69 from the dotted line position to the full line position of the parts shown. In this way the operation of the auxiliary magnet may be obtained without any additional power consumption. Furthermore, while for the circuit shown the voltage across the coils 21, 22 and 23, and hence also that across coils 30, 31 and 32, may not always be uniform and one of each of these sets of coils may at times be de-energized, the voltage is sufficient whenever the circuit through the battery or source of E. M. F. 56 is complete to energize the solenoid and move the parts to the full line position shown in Fig. 1. Since instruments of the ratiometer type are essentially independent of line voltage fluctuations, except for the disturbing influences of permanently mounted return magnets or hair springs, which are not needed in accordance with the present invention, the instrument disclosed here will be substantially independent of line voltage fluctuations, as these disturbing influences are removed by the use of the present invention. Also, since the return magnet 58 is moved to and held in an inoperative position during the normal operation of the indicator, this magnet will not affect the normal scale characteristics of the indicating element.

It is also contemplated that the return magnet could be permanently positioned at the position shown at 63 in Fig. 1 and shown in full lines in Fig. 2, and take the form of an electromagnet, current through which from a suitable source of direct current E. M. F., in order to make the magnetic force created thereby directional in character, could then be controlled by a relay switch from the same or some other source of E. M. F. as the main instrument circuit, i. e., the battery 56; and a relay switch provided operated by a solenoid as shown at 70, the arrangement being such that when the relay was de-energized, the switch would be closed, and vice versa.

Referring now to Fig. 1, the manner in which the present invention provides for the elimination of the dead spot from which the pointer of previous instruments would not return to an off-scale position, substantially 180° distant therefrom, will now be described in greater detail. As previously stated, indicators of the prior art had difficulty under these circumstances when the pointer was at about 180° from the preferred off-scale position at the time power was cut off. This was partially due to the equal repulsion of the poles of the rotor magnet and the return magnet and partially to such friction as might exist in respect to the moving element. According to the present invention, this condition is effectually eliminated by causing the auxiliary magnet en route from its inoperative to its operative position to swing in from the side as shown. Assuming, for example that the power is cut off as by opening the switch 54 when the pointer is indicating a mid-scale position as shown for example in Fig. 1 in full lines, then as the auxiliary magnet 58 moves toward its operative position and passes through the intermediate position shown at 62, Fig. 1, the reaction between the north pole of the auxiliary magnet and the south pole of the rotor magnet 26, will impart a spinning force to the rotor sufficient at least to move it from the dead spot position. When the auxiliary magnet thereafter comes to its full operative position shown at 63 in Fig. 1 and in full lines in Fig. 2, it will be effective to continue the movement of the rotor to the position of the pointer shown in dotted lines at 59 in Fig. 1, which is the predetermined off-scale position of the present invention as shown in the drawings.

While there has been shown and particularly described herein but one specific embodiment of the invention, the range of equivalents and the requisites for such equivalents have been particularly pointed out hereinabove and are further pointed out in detail in the appended claims which are to be construed validly as broadly as the state of the prior art permits.

What is claimed is:

1. In an electrical indicating instrument having a movable indicating element cooperating with a fixed indicating element for indicating the magnitude of a condition and means including a plurality of coils, through which current may be passed, constructed and arranged to be activated and deactivated by the passage and cessation of current through such coils and effective when activated for positioning said element to indicate said magnitude, apparatus for moving said movable element to a predetermined position to indicate that the instrument is not operating, comprising means movable between operative and inoperative positions and when at its inoperative position electrically and mechanically separate and distinct from said element moving means and as to which the position of said movable element is independent during the activation and consequent operation of said element moving means, an electromagnetic holding means having a plurality of windings which are respectively in the circuit with each of said coils and are all operated in response to flow of current therethrough for holding said movable means in its inoperative position during all the time in which said movable element is positioned by said element moving means in accordance with the magnitude of the condition to be indicated, means effective to move said movable means to its operative position upon the cessation of current flow through all said coils and the consequent cessation of current flow through all the windings of said electromagnetic holding means, and means operating in response to said movable means moving to its operative position for moving said movable element to its predetermined position aforesaid.

2. In an electrical indicating instrument having a movable indicating element cooperating with a fixed indicating element for indicating the magnitude of a condition and means including a permanent magnet movable with said movable element and a plurality of fixed coils magnetically associated therewith and constructed and arranged to be activated and deactivated by flow and cessation of current through said coils respectively and effective when activated for moving said movable element to indicate said magnitude, apparatus for moving said movable element to a predetermined position to indicate that the instrument is not operating, comprising means separate and distinct from said movable element and parts moving therewith and as to which the position of said movable element is independent during the activation and consequent operation of said element moving means for interposing in the field of said permanent magnet, only during the deactivation of said element moving means, a directional magnetic field capable of reacting with the field of the first named permanent magnet to move said movable element to a predetermined position aforesaid, and means including an electromagnetic holding means having a winding in the circuit with each of said coils respectively for controlling the effectiveness of said directional magnetic field so as to restrict its effectiveness to time periods during which said electromagnetic holding means is de-energized by the cessation of current flow through all the windings thereof due to cessation of current flow through all of said coils.

3. In an electrical indicating instrument having a movable indicating element cooperating with a fixed indicating element for indicating the magnitude of a condition and means including a permanent magnet mounted to move with said movable element and a plurality of coils magnetically associated with said permanent magnet constructed and arranged to be activated and deactivated by flow and cessation of current through said coils and effective when activated for moving said movable element to indicate said magnitude, apparatus for moving said movable element to a predetermined position to indicate that the instrument is not operating, comprising means including a second permanent magnet movable between operative and inoperative positions and when at its operative position electrically and mechanically separate and distinct from said element moving means, said second permanent magnet when at its inoperative position being substantially outside the field of the first named permanent magnet, and as to which the position of said movable element is independent during the activation and consequent operation of said element moving means, an electromagnetic holding means having windings respectively in circuit with each of said coils and operated in response to the activation of said element moving means by the flow of current through any of said coils for holding the second named permanent magnet in its inoperative position out of the field of the first named permanent magnet during all the time in which said movable element is positioned by said element moving means in accordance with the magnitude of the condition to be indicated, means effective to move said movable means and said second named permanent magnet to its operative position upon the deactivation of said element moving means and consequent de-energization of said electromagnetic holding means by cessation of flow of current through all the windings thereof, and means operated in response to said movable means moving said second named permanent magnet to its operative position to interpose a directional magnetic force into the field of the first named permanent magnet to cause said movable element to move to its predetermined position aforesaid.

4. In an electrical indicating instrument having a rotatable indicating element cooperating with a fixed indicating element for indicating the magnitude of a condition and means including a permanent magnet rotatable coaxially with said movable element and a plurality of coils magnetically associated therewith and arranged to be activated and deactivated by flow and cessation of current through said coils and effective when activated for controlling the position of said movable element to indicate said magnitude, apparatus for moving said movable element to a predetermined off-scale position to indicate that the instrument is not operating, comprising a pivotally mounted arm having a permanent magnet secured thereto at its free end movable by the pivotal movement of said arm between an operative position wherein the second named permanent magnet is within the field of the first named permanent magnet but axially offset therefrom and an inoperative position wherein the second named permanent magnet is substantially laterally outside the field of the first named permanent magnet, whereby at the inoperative position said second named permanent magnet is electrically and mechanically separate and distinct from the first named permanent magnet and the coils associated therewith, and whereby the position of said movable element during the activation and consequent operation of the instrument is independent of said second named permanent magnet, an electromagnetic holding means having a winding respectively associated in the circuit with each of said coils for holding said arm and the second named permanent magnet in its inoperative position during all the time in which said movable element is positioned by the magnetic reaction between said coils and said first named permanent magnet, and resilient means effective upon the de-energization of said electromagnetic holding means by the cessation of current flow through all the windings thereof for moving said second named permanent magnet to its operative position upon cessation of current flow through all said coils, said two named permanent magnets reacting together when the second named permanent magnet is at its operative position to effect rotation of said rotatable element to said predetermined off-scale position.

5. In an electrical indicating instrument of the ratiometer type having a rotatable indicating element cooperating with a fixed indicating element for indicating the magnitude of a condition and means including a permanent magnet mounted for coaxial rotation with said rotatable element and three Y-connected fixed coils magnetically associated with said permanent magnet for controlling the position thereof during periods of current flow through said coils, apparatus for moving said rotatable element to a predetermined off-scale position to indicate cessation of current flow through said coils, comprising a second permanent magnet constructed and arranged for movement between an operative position axially offset from but in the magnetic field of the first named permanent magnet and an inoperative position wherein the second named permanent magnet is substantially laterally outside the field of the first named permanent magnet, whereby said second named permanent magnet when at its inoperative position is electrically and mechanically separate and distinct from the magnetic field of said first named permanent magnet and said coils, and whereby the position of said rotatable element and the first named permanent magnet is independent of said second named permanent magnet at the inoperative position of the latter, an electromagnetic holding means having a winding in circuit with each of said coils respectively so that current flow through any one of said coils will result in current flow through the respectively associated windings of said electromagnetic holding means, said windings being further constructed and arranged so that energization of any one of the windings thereof will be effective to hold said second named permanent magnet at its inoperative position, and resilient means effective upon the de-energization of all said windings of said electromagnetic holding means to move said second named permanent magnet to its operative position, said two named permanent magnets conjointly interacting when the second named permanent magnet is at its operative position to cause a movement of said rotatable element to said predetermined off-scale position.

6. In a ratiometer type indicating instrument having a transversely magnetized rotor and a plurality of deflecting coils adapted upon energization to control the position of said rotor, a reset means effective to move said rotor to a predetermined position, solely during deenergization of said deflecting coils, comprising a permanent magnet, means mounting said permanent magnet so that it is movable into and substantially away from a position in the magnetic field of said magnetized rotor, means resiliently urging said permanent magnet toward its position in said field, and means energized concomitantly with said deflecting coils for holding said permanent magnet in its position remote from said field.

7. Reset means for a ratiometer-type instrument in accordance with claim 6, wherein said concomitantly energized means comprises an electromagnetic holding means having at least one winding in series with one of said deflecting coils.

8. Reset means for a ratiometer-type instrument in acordance with claim 6, wherein said concomitantly energized means comprises an electromagnetic holding means having a plurality of windings respectively in series with said deflecting coils and all effective to cause a flow of magnetic flux in said electromagnetic holding means in the same direction.

CLARENCE DE GIERS.

REFERENCES CITED

The following references are of record in the file of this patent:

UNITED STATES PATENTS

| Number | Name | Date |
|---|---|---|
| 2,382,295 | Conrad | Aug. 14, 1945 |
| 2,382,315 | Hiller | Aug. 14, 1945 |